US012560517B2

(12) United States Patent    (10) Patent No.:   US 12,560,517 B2
Yeo    (45) Date of Patent:    Feb. 24, 2026

(54) DEVICE FOR AND METHOD OF DETERMINING WHETHER OR NOT ELECTRODE TAB IS BENT

(71) Applicants: Hyundai Motor Company, Seoul (KR); Kia Corporation, Seoul (KR)

(72) Inventor: Yeol Mae Yeo, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 781 days.

(21) Appl. No.: 17/730,766

(22) Filed: Apr. 27, 2022

(65) Prior Publication Data

US 2023/0184651 A1    Jun. 15, 2023

(30) Foreign Application Priority Data

Jul. 14, 2021    (KR) ........................ 10-2021-0092404

(51) Int. Cl.
| | |
|---|---|
| *G01N 5/00* | (2006.01) |
| *G01G 19/413* | (2006.01) |
| *H01M 50/533* | (2021.01) |

(52) U.S. Cl.
CPC ............. *G01N 5/00* (2013.01); *G01G 19/413* (2013.01); *H01M 50/533* (2021.01)

(58) Field of Classification Search
CPC ..... G01N 5/00; G01G 19/413; H01M 50/533;
H01M 10/4285; H01M 50/531; H01M 10/0404; H01M 10/0413; H01M 10/0436; Y02E 60/10; G01L 5/0038; G01L 5/0052
See application file for complete search history.

(56) References Cited

FOREIGN PATENT DOCUMENTS

| | | |
|---|---|---|
| KR | 20070071345 A | 7/2007 |
| KR | 10-1058388 B1 | 8/2011 |
| KR | 20190006920 A | 1/2019 |
| KR | 20200017824 A | 2/2020 |
| KR | 2020-0053784 A | 5/2020 |
| KR | 20200109040 A | 9/2020 |
| KR | 20200131541 A | 11/2020 |
| KR | 102236815 B1 | 4/2021 |
| KR | 10-2022-0068696 A | 5/2022 |

*Primary Examiner* — Nicholas A Smith
*Assistant Examiner* — Seamus Patrick Mcnulty
(74) *Attorney, Agent, or Firm* — Fox Rothschild LLP

(57) ABSTRACT

A device for determining whether or not positive and negative electrode tabs constituting an electrode assembly are bent includes: a stably nesting portion in which the electrode assembly is stably nested; an electrode tab contact portion arranged on a side surface of the stably nesting portion and configured to move downward so as to come into contact with one end portion of an electrode tab, bending the electrode tab, and to elastically restore the electrode tab to an original state thereof; a weight measurement unit arranged above the stably nesting portion and configured to measure, on a per-area basis, a weight of the electrode tab that is elastically restored to an original state thereof; and a determination unit configured to determine whether or not the electrode tab is bent, depending on an area where the weight is measured.

8 Claims, 6 Drawing Sheets

(ELECTRODE TAB IN
NORMAL STATE)

(ELECTRODE TAB IN
BENT STATE)

DEVICE FOR AND METHOD OF DETERMINING WHETHER OR NOT ELECTRODE TAB IS BENT

CROSS REFERENCE TO RELATED APPLICATION

The present application claims under 35 U.S.C. § 119(a) the benefit of Korean Patent Application No. 10-2021-0092404, filed Jul. 14, 2021 in the Korean Intellectual Property Office, the entire contents of which are incorporated herein by reference.

BACKGROUND

Technical Field

Embodiments of the present disclosure relate to a device for, and a method of, determining whether or not electrode tabs for positive and negative electrodes of a lithium secondary battery are bent.

Description of the Related Art

A secondary battery is used as a high-capacity power storage battery for electric vehicles, battery power storage systems, or the like, or as a small-sized high-performance energy source for portable electronic devices, such as mobile terminals, camcorders, or notebook computers. A study has been conducted on reducing weight of components and low power consumption thereof for the purpose of miniaturization of portable electronic devices and the use thereof for long periods of time. There is also an increasing demand for a small-sized high-capacity secondary batteries.

An electrode assembly in the secondary battery is formed by sequentially stacking a positive electrode, a separation film, and a negative electrode on top of each other. One end portion of the positive electrode that is not coated with a positive electrode active material, and one end portion of the negative electrode that is not coated with a negative electrode active material, are referred to as a positive electrode tab and a negative electrode tab, respectively. A metal lead is welded for attaching to a portion of the tab, which is exposed to outside of an exterior material for the secondary battery. In most cases, the metal lead is formed of aluminum or nickel.

A phenomenon where the electrode tab is bent occurs due to various causes during an assembly process, a transportation process, or the like. In a case where the electrode tab is bent, a positive or negative electrode and a positive or negative electrode active material may be brought into contact with each other and thus an internal short circuit may occur. Furthermore, lithium deposition occurs excessively in a bent portion of the electrode tab. Thus, a reversible capacity of a battery and the lifetime thereof can be reduced, and a lithium dendrite deposited can pass through the separation film, thereby causing the internal short circuit.

Accordingly, embodiments of the present disclosure provide a device for, and a method of, determining whether nor an electrode tab is bent.

The foregoing is intended merely to aid in understanding the background of embodiments of the present disclosure, and therefore should not be interpreted to admit that the present disclosure falls within the purview of the related art that is already known to a person of ordinary skill in the art.

SUMMARY

An objective of embodiments of the present disclosure is to provide a device for determining whether or not an electrode tab is bent. In further embodiments device can be configured to determine whether or not positive and negative electrode tabs constituting an electrode assembly are bent. The device can include: a stably nesting portion in which the electrode assembly is stably nested; an electrode tab contact portion arranged on a side surface of the stably nesting portion, and configured to move downward so as to come into contact with one end portion of an electrode tab, bending the electrode tab, and to elastically restore the electrode tab to an original state thereof; a weight measurement unit being arranged above the stably nesting portion and configured to measure, on a per-area basis, a weight of the electrode tab elastically restored to an original state thereof; and a determination unit configured to determine whether or not the electrode tab is bent, depending on an area where the weight is measured.

In an embodiment of the device, a cross-section of the electrode tab contact portion may be in the shape of a trapezoid having an upper side longer than a lower side.

In an embodiment of the device, a plurality of protrusions may be formed on a side surface of the electrode tab contact portion and configured to come into contact with the electrode tab in such a manner as to be positioned a distance apart from each other.

In an embodiment of the device, the weight measurement unit may include a plurality of sensors measuring the weight and a housing within which the sensor is mounted.

In an embodiment of the device, the plurality of sensors may be mounted within the housing in such a manner as to be positioned a distance apart from each other.

In an embodiment of the device, the determination unit may receive from the weight measurement unit information on an area where the weight is measured. When the weight is not measured in one or several areas, the determination unit may determine that the electrode tab is bent.

According to another embodiment of the present disclosure, a method of determining whether or not an electrode tab is bent is provided. The method includes: nesting stably an electrode assembly in a stably nesting portion; causing an electrode tab contact portion to descend; measuring a weight of the electrode tab elastically restored to an original state thereof; and determining whether or not the electrode tab is bent, through information on whether or not the weight is measured on a per-area basis.

In an embodiment of the method, wherein when determining of whether or not the electrode tab is bent, in a case where the weight is not measured in one or several areas, it may be determined that the electrode tab is bent.

In embodiments of the device for and the method of determining whether or not an electrode tab is bent according to the present disclosure, an elastic restoration force of the electrode tab and a weight transferred by the elastic restoration force are measured on a per-area basis, and thus it is determined whether or not the electrode tab is bent. Therefore, the device and the method have the advantage of being able to determine whether or not a finished product is defective due to the bent electrode tab.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure, which are provided to address the above-described problem, will be described in detail below with reference to the accompanying drawings. A detailed description of the known technology in the art to which the prevent disclosure pertains is omitted if not helpful in understanding the nature and gist of the present disclosure.

Figure 1:
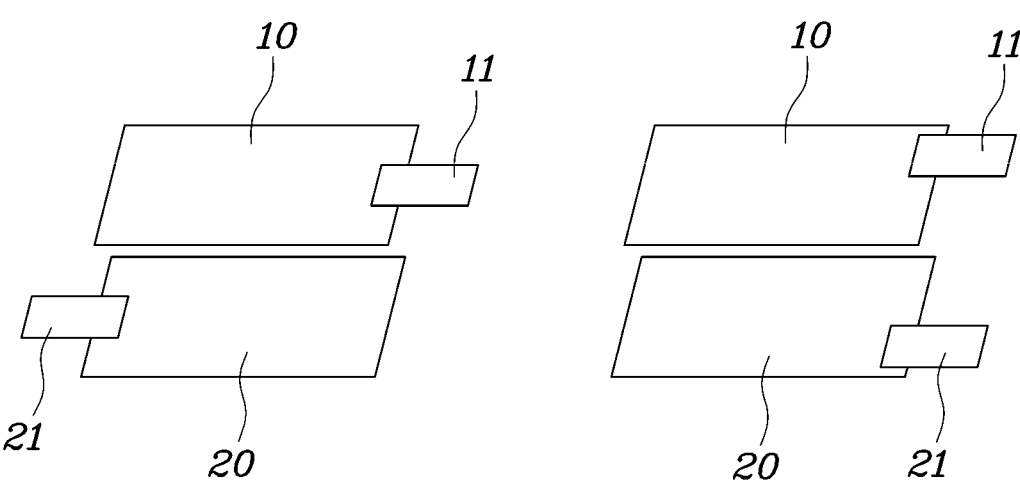
FIG. 1 is a schematic view illustrating one exemplary embodiment of an electrode assembly.

FIG. 1 is a schematic view illustrating one exemplary embodiment of an electrode assembly. With reference to FIG. 1, an electrode tab 11 and an electrode tab 21 are welded to one end portion of a positive electrode 10 and one end portion of a negative electrode 20, respectively, that constitute an electrode assembly. The electrode tab 11 and the electrode tab 21 are attached to respective non-coated portions, respectively, of the positive and negative electrodes 10 and 20. The non-coated portions are not coated with a positive electrode active material or a negative electrode active material. The electrode tab 11 and the electrode tab 21 are referred to as a positive electrode tab 11 attached to the positive electrode 10 and a negative electrode tab 21 attached to the negative electrode 20. The positive electrode tab 11 and the negative electrode tab 21 are formed of a metal material, such as aluminum, nickel, and copper. Normally, the positive electrode tab 11 and the negative electrode tab 21 are positioned in opposite directions, but may be arranged in the same direction.

One or both of electrode tabs 11 and 21 may be bent due to an external cause while going through a welding process, an assembly process for the electrode assembly or a transportation process for the finished electrode assembly. The problem related to this bending is described above.

Figure 2:
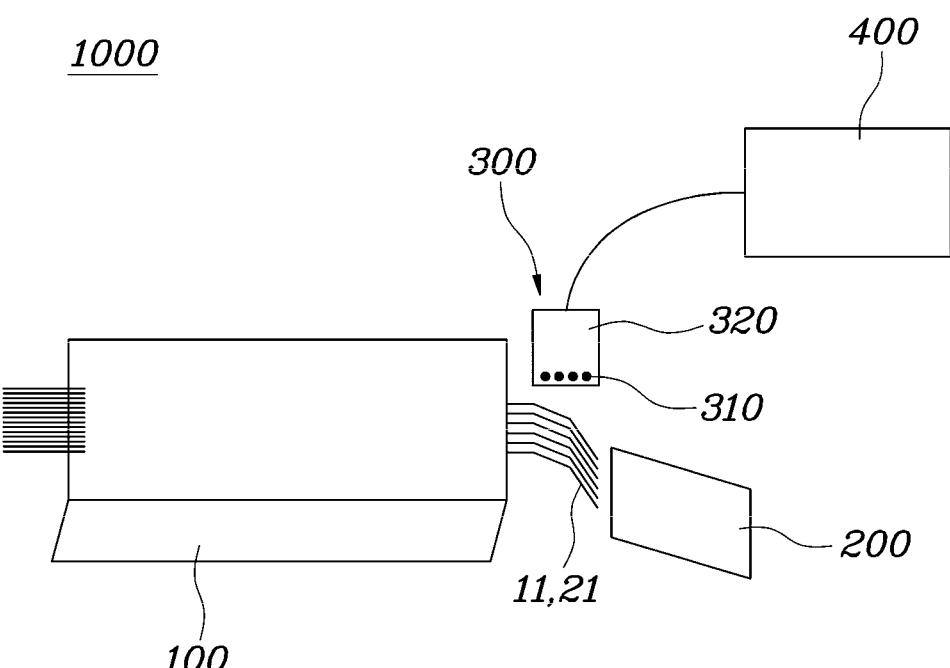
FIG. 2 is a view illustrating a device for determining whether or not an electrode tab is bent according to a first embodiment of the present disclosure.

According to embodiments of the present disclosure, a device and a corresponding method are provided for measuring an elastic restoration force of an electrode tab and a weight thereof and thus determining whether the electrode tab (e.g., electrode tab 11 and/or 21) is bent. FIG. 2 is a view illustrating a device 1000 for determining whether or not an electrode tab is bent according to a first embodiment of the present disclosure. With reference to FIG. 2, the device 1000 includes a stably nesting portion 100, an electrode tab contact portion 200, a weight measurement unit 300, and a determination unit 400. The electrode assembly is nested in the stably nesting portion 100. The electrode tab contact portion 200 is arranged on a side surface of the stably nesting portion 100, and is configured to move downward so as to come into contact with one end portion of the electrode tab 11 and 12, to bend the electrode tab 11 and 21, and to elastically restore the electrode tab 11 and 21 to an original state thereof.

The weight measurement unit 300 is arranged above the stably nesting portion 100 and is configured to measure, on a per-area basis, a weight of the electrode tab 11 and 21 that is elastically restored to an original state thereof. The determination unit 400 determines whether or not the electrode tab 11 and 21 is bent, depending on an area where the weight is measured.

Specifically, in operation of the device 1000, the electrode assembly to which the positive electrode tab 11 and the negative electrode tab 21 are attached is stably nested in the stably nesting portion 100. The positive electrode tab 11 and the negative electrode tab 21 are stably nested in the stably nesting portion 100 in such a manner as to face the electrode tab contact portion 200. Subsequently, the electrode tab contact portion 200 descends, and one end portion of the electrode tab contact portion 200 comes into contact with one end portion of the electrode tabs 11 and 21. The electrode tabs 11 and 21 that comes into contact with the electrode tab contact portion 200 is bent by a force exerted by the descending electrode tab contact portion 200.

Figure 3:
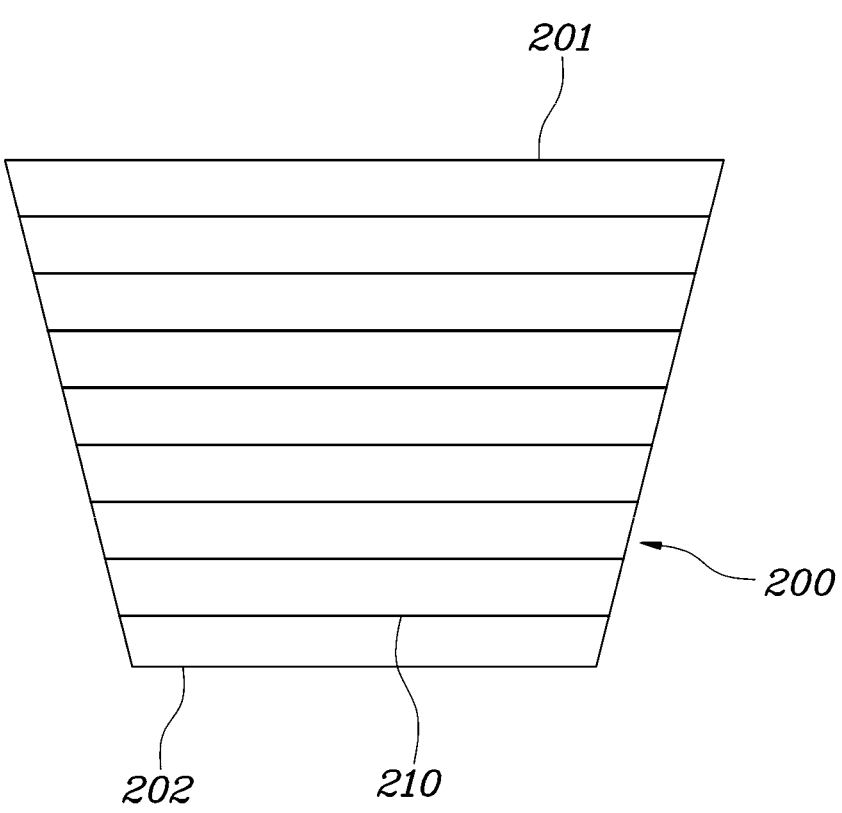
FIG. 3 is a view illustrating a cross-section of an electrode tab contact portion of the device of FIG. 2 coming into contact with the electrode tab.

FIG. 3 is a view illustrating a cross-section of the electrode tab contact portion 200 coming into contact with the electrode tab (e.g., electrode tab 11 and/or 21). With reference to FIG. 3, a plurality of protrusions 210 are formed on a side surface of the electrode tab contact portion 200 and positioned a distance apart from each other. The plurality of protrusions 210 come into direct contact with the electrode tab 11 and 21 when the electrode tab contact portion 200 descends, thus bending the electrode tabs 11 and 21.

In certain embodiments, it is desirable that the protrusions 210 are formed of a rubber material or the like. So configured, when the electrodes tab 11 and 21 comes into contact with the protrusions 210, the protrusions 210 exert a frictional force on the smallest contact area of the electrodes tab 11 and 21 and also provide a sufficient contact time.

The contact of the electrode tabs 11 and 21 and the protrusions 210 keeps the electrode tabs 11 and 21 bent, and then the protrusions 210 are separated from the electrode tab 11 and 21 at any moment. Thus, the electrode tabs 11 and 21 ascend by the elastic restoration force thereof. The ascending electrode tabs 11 and 21 contact the weight measurement unit 300, directly or indirectly. That is, an uppermost one of the electrode tabs 11 and 21 (e.g., the electrode tab that is positioned at an uppermost position in the electrode assembly) contacts the weight measurement unit 300 directly. Then, a lowermost electrode tab that is positioned below the uppermost electrode tab hits the uppermost electrode tab positioned above. Thus, the uppermost electrode tab hits the weight measurement unit 300 and transfers the weight to the weight measurement unit 300 indirectly. Accordingly, the pressure transferred to the weight measurement unit 300 is gradually decreased.

A cross-section of the electrode tab contact portion 200 may be in the shape of a trapezoid having an upper side 201 longer than a lower side 202. The protrusions 210 are formed in such a manner as to be positioned a distance apart from each other. The closer the protrusion 210 is to the lower side 202, the shorter the length of the protrusion 210 may be. The reason for this is as follows. In a case where the protrusion adopts a rectangle or a square shape, the cross-section of the electrode tab contact portion 200 has the upper and lower sides 201 and 202 having the same length. The protrusions 210, formed in such a manner that lengths thereof, are adjusted suitably for the lengths of the upper and lower sides 201 and 202 and thus are relatively greater than those in the device according to the first embodiment of the present disclosure, and apply pressure to one end portion of the electrode tabs 11 and 21. However, when this applied pressure exceeds an elastic limit of the electrode tabs 11 and 21, the electrode tabs 11 and 21 may become permanently deformed, and thus may not be restored to the original states thereof. Furthermore, the contact time may be lengthened. Thus, the electrode tab 11 and 21 may be damaged. It is desirable that the length of the upper side 201 may be the same as a vertical length of the electrode tab and that the length of the lower side 202 may be approximately half of the vertical length of the electrode tab.

The weight of the electrode tabs 11 and 21 is transferred by the elastic restoration force to the weight measurement unit 300. The weight measurement unit 300 is configured to include a plurality of sensors 310 that are configured to measure the weight, and a housing 320 within which the plurality of sensors 310 are mounted. The plurality of sensors 310 are mounted within the housing 320 in such a manner as to be positioned a distance apart from each other. The plurality of sensors 310 may measure the weight on a per-area basis (e.g., a stress).

Figures 4A, 4B:
FIGS. 4A and 4B are views illustrating the electrode tab in a normal state and the electrode tab in a bent state, respectively.

For example, as illustrated in FIG. 4A, in a case where the electrode tab 11 and 21 hits the weight measurement unit 300 indirectly and directly without being bent, all the sensors 310 measure the weight. However, as illustrated in FIG. 4B, in a case where a portion of the electrode tab 11 and 21 is bent, the portion of the electrode tabs 11 and 21 hits the weight measurement unit 300 directly and indirectly, and thus one or several of the plurality of sensors 310 do not measure the weight.

The housing 320 of the weight measurement unit 300 may be in the shape of a rectangular parallelepiped. In this case, it is desirable that a bottom face is in the shape of a rectangle, so that a traverse length of the bottom face is the same as that of the electrode tab, and that a longitudinal length of the bottom face is half or more of that of the electrode tab.

In addition, the plurality of sensors 310 are mounted in such a manner as to be positioned a distance apart from each other. In this case, it is desirable that many of the sensors 310 are mounted on an internal surface of the housing 320, which faces an end portion of the electrode tabs 11 and 21. The reason for this is because, in most cases, the end portion of the electrode tab 11 and 21 is bent.

The weight measurement unit 300 is configured to transmit, to the determination unit 400, the measured weight along with information on the area where the weight is measured. The determination unit 400 is configured to receive, from the weight measurement unit 300, the information on the area where the weight is measured. In a case where the weight is measured in all areas, the determination unit 400 determines that the electrode tab 11 and 21 is in a normal state. However, in a case where the weight is not measured in one or several areas, the determination unit 400 determines that the electrode tab 11 and 21 is bent.

Figure 5:
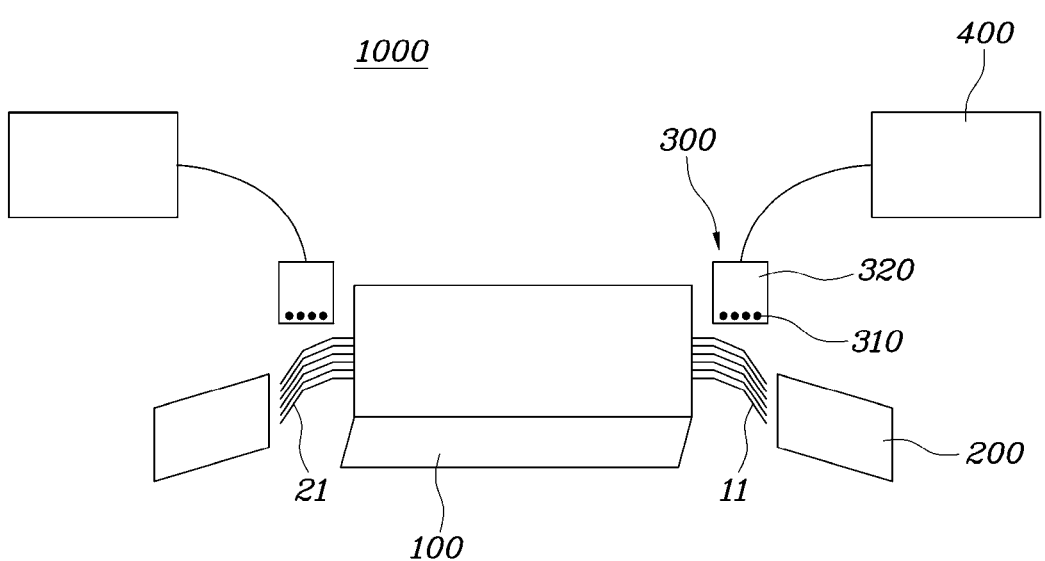
FIG. 5 is a view illustrating a device for determining whether or not an electrode tab is bent according to a second embodiment of the present disclosure.

As illustrated in FIG. 5, according to a second embodiment of the present disclosure, in a case where the positive electrode tab 11 and the negative electrode tab 21 are positioned in opposite directions, a pair of devices for determining whether or not an electrode tab is bent may be provided to be positioned in such a manner as to face each other in order to determine at the same time whether or not the positive electrode tab 11 and the negative electrode tab 21 are bent. In a case where the positive electrode tab 11 and the negative electrode tab 21 are positioned in the same direction, the devices for determining whether or not an electrode tab is bent may be positioned side by side.

As another implementation example, in the case where the positive electrode tab 11 and the negative electrode tab 21 are positioned in opposite directions, one device for determining whether or not an electrode tab is bent may determine whether one of the positive electrode tab 11 and the negative electrode tab 21 is bent. After the stably nesting portion 100 is rotated by 180 degrees, the one device for determining whether or not an electrode tab is bent may determine whether or not one of the positive electrode tab 11 and the negative electrode tab 21 is bent.

In addition, in the case where the positive electrode tab 11 and the negative electrode tab 21 are positioned in the same direction, one device for determining whether or not an electrode tab is bent may determine whether or not one of the positive electrode tab 11 and the negative electrode tab 21 is bent. After the stably nesting portion 100, or the electrode tab contact portion 200 and the weight measurement unit 300 are moved toward the positive electrode tab 11 or the negative electrode tab 21, the one device for determining whether or not an electrode tab is bent may determine whether or not the other one of the positive electrode tab 11 and the negative electrode tab 21 is bent.

Figure 6:
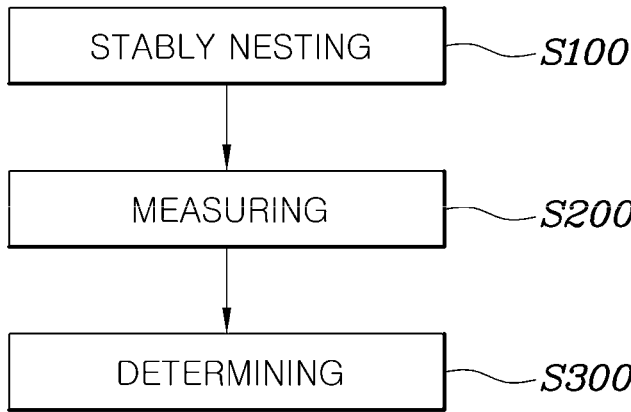
FIG. 6 is a flowchart illustrating one exemplary embodiment of a method for determining whether or not an electrode tab is bent according to a third embodiment of the present disclosure.

FIG. 6 is a flowchart illustrating one exemplary embodiment of a method of determining whether or not an electrode tab is bent according to a third embodiment of the present disclosure. With reference to FIG. 6, the method includes: a stably nesting step S100 of stably nesting an electrode assembly in a stably nesting portion; a measurement step S200 of causing an electrode tab contact portion to descend and measuring a weight of an electrode tab elastically restored to an original state thereof; and a determination step S300 of determining whether or not the electrode tab is bent, through information on whether the weight is measured on a per-area basis. In the determination step S300, in a case where the weight is not measured in one or several areas, it may be determined that the electrode tab is bent.

The specific embodiments of the present disclosure are illustrated and described, those skilled in the art will appreciate that the disclosed embodiments can be variously modified and altered without departing from the technical idea of the present disclosure defined in the following claims.

What is claimed is:

1. A device for determining whether or not an electrode tab is bent, the device comprising:
   a stably nesting portion in which the electrode assembly is stably nested;
   an electrode tab contact portion arranged on a side surface of the stably nesting portion and configured to move downward so as to come into contact with one end portion of an electrode tab, bending the electrode tab, and to elastically restore the electrode tab to an original state thereof;
   a weight measurement unit arranged above the stably nesting portion and configured to measure, on a per-area basis, a weight of the electrode tab elastically restored to an original state thereof; and
   a determination unit configured to determine whether or not the electrode tab is bent, depending on an area where the weight is measured.

2. The device of claim 1, wherein a cross-section of the electrode tab contact portion is in the shape of a trapezoid having an upper side longer than a lower side.

3. The device of claim 1, wherein a plurality of protrusions are formed on a side surface of the electrode tab contact portion and configured to come into contact with the electrode tab in such a manner as to be positioned a distance apart from each other.

4. The device of claim 1, wherein the weight measurement unit comprises
   a plurality of sensors measuring the weight; and
   a housing within which the sensor is mounted.

5. The device of claim 4, wherein the plurality of sensors are mounted within the housing in such a manner as to be positioned a distance apart from each other.

6. The device of claim 1,
   wherein the determination unit receives from the weight measurement unit information on an area where the weight is measured, and
   wherein in a case where the weight is not measured in one or several areas, the determination unit determines that the electrode tab is bent.

7. A method of determining whether or not an electrode tab is bent, the method comprising:
   nesting stably an electrode assembly in a stably nesting portion;
   causing an electrode tab contact portion to descend;
   measuring a weight of the electrode tab elastically restored to an original state thereof; and
   determining whether or not the electrode tab is bent, through information on whether or not the weight is measured on a per-area basis.

8. The method of claim 7, wherein when determining of whether or not the electrode tab is bent, in a case where the weight is not measured in one or several areas, it is determined that the electrode tab is bent.

* * * * *